Feb. 18, 1930. C. H. BERILL 1,747,284
WINDSHIELD WIPER
Filed June 22, 1928 3 Sheets-Sheet 1
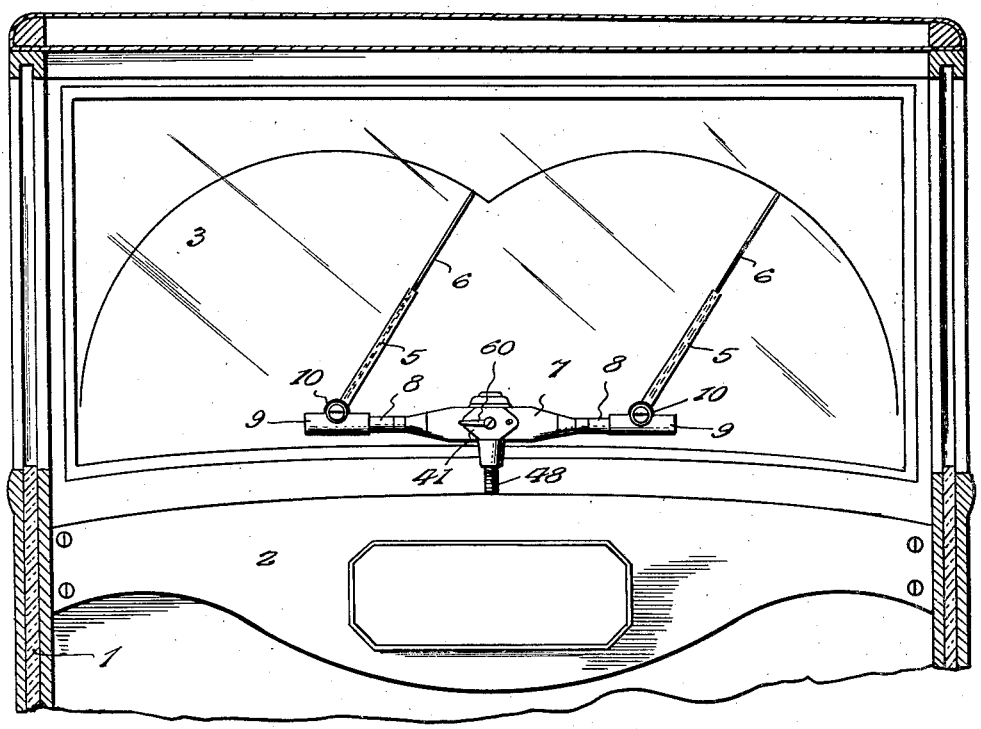
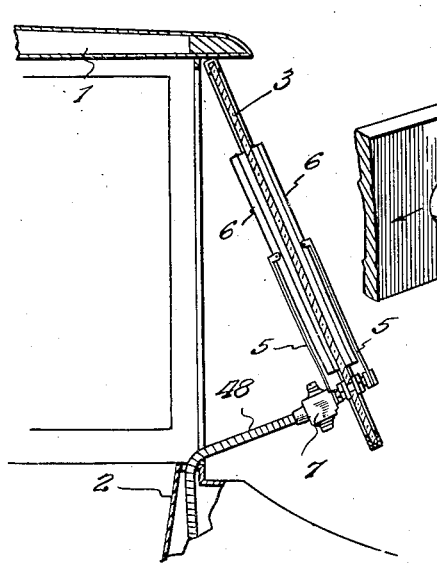
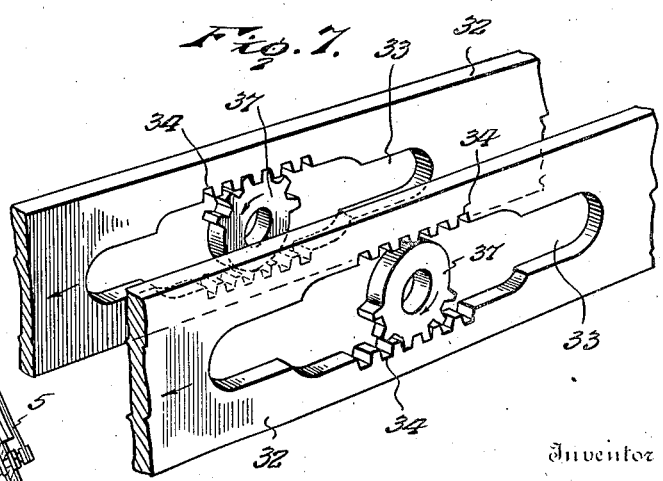
Inventor
C. H. Berill.
By Lacey & Lacey, Attorneys

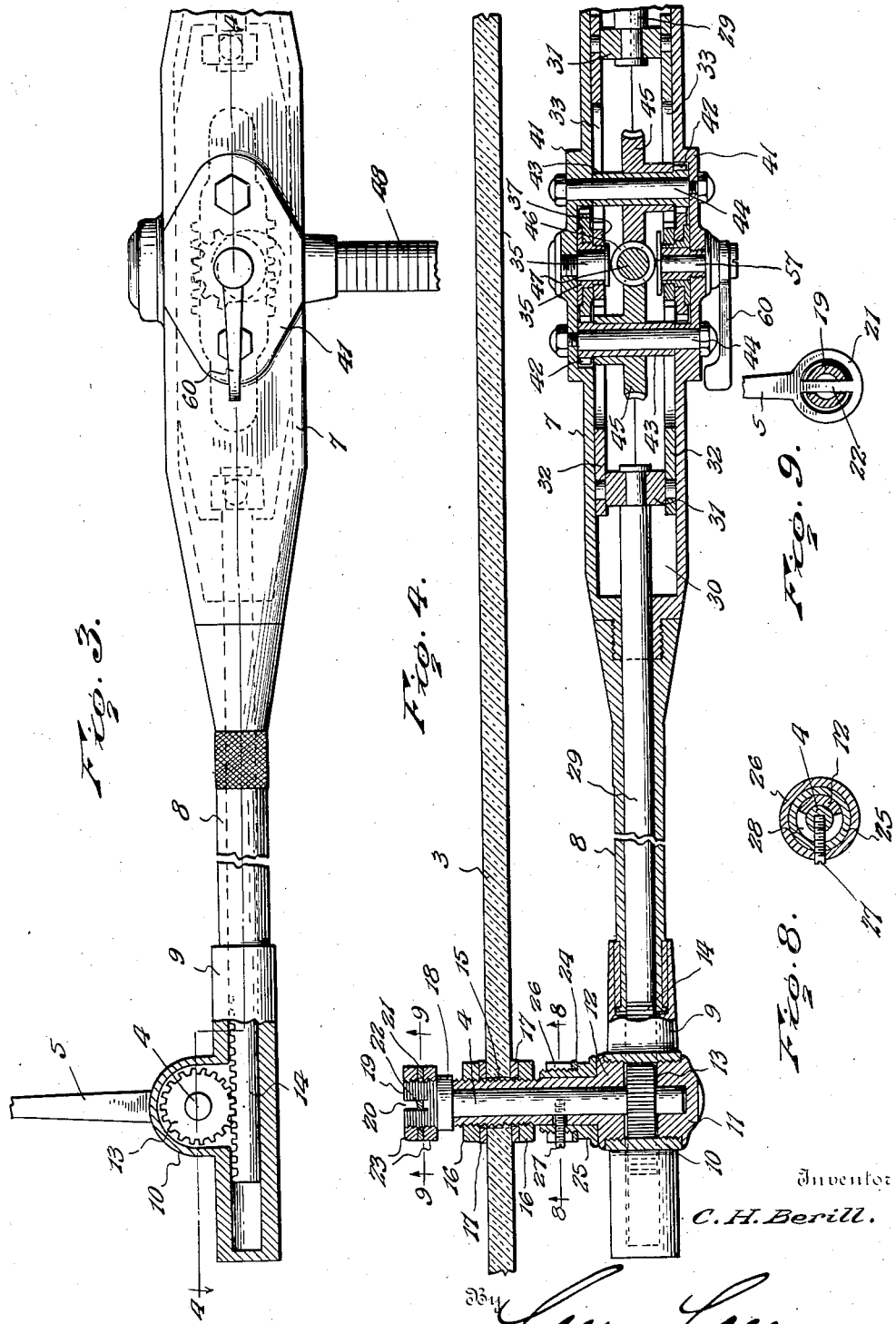

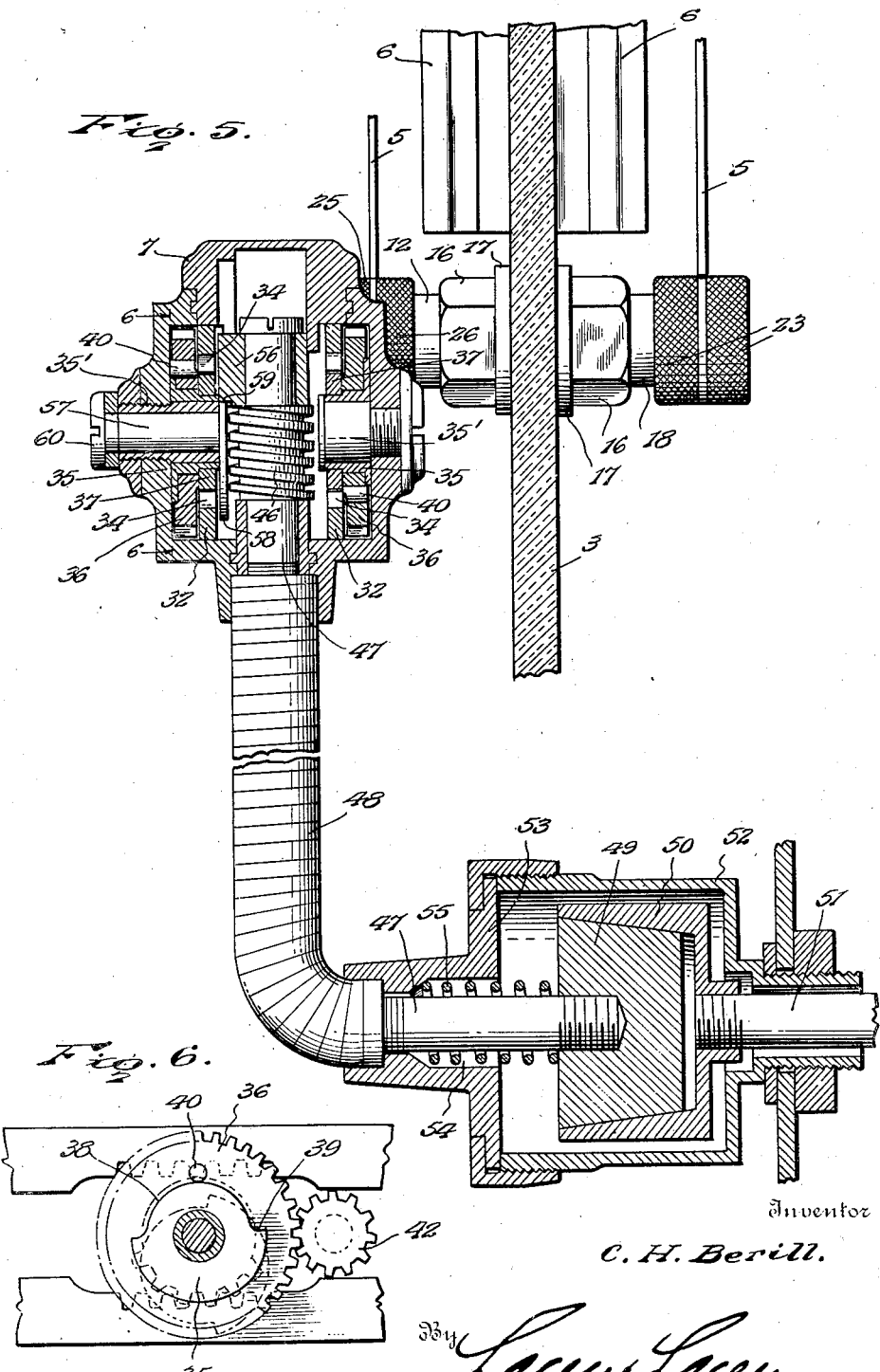

Patented Feb. 18, 1930

1,747,284

UNITED STATES PATENT OFFICE

CARROLL H. BERILL, OF NEW YORK, N. Y.

WINDSHIELD WIPER

Application filed June 22, 1928. Serial No. 287,576.

This invention relates to windshield wipers and has for its object the provision of wiper driving means which will be effectually balanced and impart a steady even motion to the wipers. A further object of the invention is to provide a wiper mechanism which will be very compact and may be applied to the windshield adjacent the lower edge of the same and operate the wiper arms in upwardly extending arcs whereby to give the driver a clear field of vision. A further object of the invention is to provide a wiper mechanism in which wiper arms will be applied to both sides of the windshield and any dirt or moisture which may find lodgment upon the inner, or rear face of the shield will be removed. Other objects of the invention will appear incidentally in the course of the following description, and the invention resides in certain novel features which will be particularly pointed out in the appended claims.

In the drawings:

Figure 1 is a rear elevation of a windshield having my improved wipers applied thereto;

Fig. 2 is a vertical section taken longitudinally of an automobile through the windshield with the wiper in position thereon and showing the windshield partly open;

Fig. 3 is an enlarged rear elevation of the wiper casing, parts being shown in section;

Fig. 4 is a horizontal section on the line 4—4 of Fig. 3;

Fig. 5 is an enlarged vertical section taken centrally through the driving gearing;

Fig. 6 is a detail section on the line 6—6 of Fig. 5;

Fig. 7 is a detail perspective view of the wiper driving racks;

Fig. 8 is a detail section on the line 8—8 of Fig. 4, and

Fig. 9 is a detail section on the line 9—9 of Fig. 4.

A portion of an automobile body is indicated at 1 with an instrument board 2 and a windshield 3. In carrying out the present invention, openings are formed through the windshield adjacent the lower edge of the same and at opposite sides and equi-distant from its vertical center to receive rock shafts and bearings therefor upon which the wiper arms are carried, the rock shafts being shown at 4 and the wiper arms at 5. Each wiper arm carries a wiper 6 of the usual or any approved form, and it is to be observed that the wiper arms and wipers are provided not only in duplicate but also at the front and the rear of the windshield so as to bear upon both surfaces of the same, as shown most clearly in Fig. 2. Disposed at the rear of the windshield and adjacent the lower edge thereof is a casing 7 to the ends of which are secured sleeves 8 extending parallel with the windshield toward the opposite ends of the same and upon the outer ends of these sleeves are secured, in any convenient manner, and casings 9 having semi-cylindrical pockets 10 on their upper sides receiving the ends of the rock shafts 4 which carry the wiper arms. The pockets 10 are open at both their front and rear sides and are internally threaded whereby to receive a rear plug or cap 11 and the rear end of a sleeve 12 which are threaded into the pockets, as shown clearly in Fig. 4. The sleeve and the plug are provided with bores of proper diameter to receive the rock shaft 4 so as to provide a bearing support therefor and each rock shaft is equipped with a pinion 13 which lies between the plug and the sleeve and is, therefore, disposed centrally within the pocket so as to mesh with a rack bar 14, as clearly shown in Figs. 3 and 4. The sleeve 12 is reduced externally from a point adjacent the pocket 10 to its front end and projects through the opening 15 formed in the windshield to accommodate the rock shaft and its bearing. The front end portion of the sleeve is externally threaded, as shown in Fig. 4, and receives lock nuts 16 at the front and the rear of the windshield so as to firmly clamp the sleeve in place, washers 17 of some cushioning material being provided between the nuts and the windshield to avoid splitting of the shield. It will be readily noted that by this arrangement the entire apparatus is mounted upon the windshield and, consequently, in all positions of the windshield will be in position to operate thereon. The front extremity of the rock shaft 4 is expanded to provide a head 18 which is formed into a threaded extension 19 having a diametrical slot 20 therein. The front wiper arm 5 has a circular hub 21 at its end which is adapted to encircle the threaded extension 19 of the rock shaft and is also formed with a bar 22 extending diametrically across the hub to fit within the slot 20 so that, when the shaft is oscillated, the wiper arm will be caused to participate in the movement. Lock nuts 23 are fitted on the threaded extension 19 at opposite sides of the hub 21 of the wiper arm to be turned home against the same and thereby firmly secure it in place. The mounting just described is, of course, located at the front of the windshield. A second wiper arm is provided at the rear of the windshield and this second wiper arm is formed with a hub 24 fitting around a collar 25 which is mounted loosely upon the sleeve 12 and is formed with an external annular shoulder against which the hub of the wiper arm abuts. In advance of said shoulder, the collar is externally threaded to receive a ring nut 26 whereby the wiper arm will be secured to the collar. A set screw 27 is mounted radially in the ring nut 26 and passes through the collar 25 to play in an arcuate circumferential slot 28 in the bearing sleeve 12 and be secured in the rock shaft 4, as will be understood upon reference to Fig. 8. It will thus be seen that when the shaft 4 is oscillated the set screw will travel therewith in the slot 28 and the collar 25 and ring nut 26 will participate in the movement so that the desired oscillation will be imparted to the inner or rear wiper arm. The slot 28 extends through an arc of proper length to accommodate the maximum movement of the rock shaft.

The rack bars 14, previously mentioned, are formed on the outer ends of rods 29 which are fitted with a good sliding fit through the respective sleeves 8 and extend into the chamber 30 formed in the main casing 7, as shown in Fig. 4. Upon the inner end of each reciprocating rod is fitted a crosshead 31, the ends of which are operatively engaged with slotted plates 32 slidably fitted in the casing and supported by the top and bottom thereof, as will be understood upon reference to Figs. 4 and 5. These plates are formed with longitudinal slots 33 and on the upper and lower walls of these slots at the centers thereof are formed racks 34. A bearing post 35' is carried by the front wall of the casing 7 at the center thereof, and upon this post is rotatably mounted a hub member or sleeve 35 having a stepped construction whereby it is adapted to carry a master gear 36 and a mutilated pinion 37 concentric with and at the inner side of the gear. The hub 35 is reduced in diameter through one-half of its periphery, as shown at 38 in Fig. 6, thereby providing stop shoulders 39 at diametrically opposite points of the hub which at times are engaged by a pin 40 fixed to the master gear. These parts are duplicated at the front and rear of the main casing which is formed with offsets 41 at its center to accommodate the master gears and the mounting for the same. Each master gear meshes with a pinion 42, said pinions being disposed one at the front of the casing and the other at the rear thereof and at opposite sides of a line passing centrally through the casing from front to rear of the same. The pinions 42 are carried by sleeves 43 which are rotatably mounted upon posts 44 secured in the front and rear walls of the casing, as shown clearly in Fig. 4, said sleeves having worm gears 45 keyed or otherwise secured thereto so as to rotate therewith. The worm gears 45 mesh with a worm 46 formed on the upper end of the driving shaft 47 which extends vertically into the casing through the bottom of the same and at the center thereof, it being seen at once that rotation of the driving shaft will cause the worms 45 to rotate in opposite directions. The rotation of the worm gears is transmitted directly to the respective pinions 42 and by said pinions imparted to the respective master gears 36. When the apparatus is thus power driven, the rotation of the master gears will carry the pins 40 into engagement with a shoulder 39 on the adjacent bearing sleeve or hub 35 and said hub will, consequently, be caused to rotate and thereby impart movement to the mutilated pinion 37. As shown in Fig. 7, the pinions 37 have their smooth portions disposed at opposite sides of their common axis so that they will engage the respectively adjacent racks 34 alternately and thereby impart reciprocating movement to the plates 32 and the rods 29 connected therewith. The rock shafts 4 will consequently be oscillated so as to move the wipers in arcs over the windshield surfaces. It will be readily understood that, although the worm gears 45 rotate in opposite directions, the racks 34 and plates 32 will move in the same direction inasmuch as the mutilated pinions are oppositely disposed. By providing the two sets of gears at opposite sides of the driving shaft, one set balances the other set so that the movement transmitted to the wipers will be even and they will operate steadily and all lateral vibration which tends to take the parts out of alinement is overcome, the alinement of the working parts being maintained and, consequently, wear thereon being minimized so that the durability of the device is increased.

It is frequently desirable to operate the wipers momentarily and the described arrangement very conveniently meets this emergency. The hub 35 is loose in the master gear 36, although the mutilated pinion 37 is fast upon the hub. Should there be a sudden deposit of mud or any other substance upon the windshield, the inner wiper may be utilized as a handle whereby to actuate the device for effecting the removal of said deposit. When one of the inner wipers is thus oscillated by hand, the rack and pinion mechanism 14, 13 will be operated and the racks 34 will transmit movement to the mutilated pinions 37 but no movement will be imparted to the master gear inasmuch as the reduced or mutilated portion 38 of the hub will simply ride under the pin 40 free of the same. When it is subsequently desired to operate the wipers by power, the driving shaft and the master gears will simply rotate idly until the pins 40 engage the shoulders 39, whereupon the wipers will be oscillated in the manner previously described.

The driving shaft 47 is a flexible shaft of well known form extending through a flexible sheath 48 and the shaft and the sheath are trained through an opening provided therefor at the top of in the instrument board 2, as shown in Fig. 2, and carried downwardly to a point near the transmission mechanism of the vehicle. The lower end of the shaft 47 is equipped with a clutch cone 49 adapted to engage a clutch cup 50 secured on the end of a shaft 51 which may be driven from the transmission gearing of the automobile in any convenient manner. The clutch cone 49 and the clutch cup 50 are housed within a casing 52 secured upon the automobile frame in any convenient manner and including a cover 53 having a socket 54 which seats one end of an expansion spring 55 bearing at its opposite end upon the clutch cone 49 and tending constantly to retain the cup and cone in engagement. The upper end of the shaft 47 is equipped with a head 56, and a rock shaft 57 is fitted through the rear bearing post 35' and carries at its inner or front end an eccentric 58 bearing against the lower edge of the head 56, as shown at 59, whereby if the eccentric or cam be turned upwardly, the head will be lifted and the driving shaft raised so that the clutch cone 49 will be withdrawn from the clutch cup and the device thereby rendered inoperative. A handle or crank 60 is secured upon the rear or outer end of the rock shaft 57 so that said shaft may be actuated at will to throw the driving shaft into or out of gear accordingly as the wipers are or are not to operate.

From the foregoing description, taken in connection with the accompanying drawings, it will be seen that I have provided a very simple and compact device which will be very effectually balanced and all uneven wear upon the working parts eliminated. By providing wiper arms to operate upon both surfaces of the windshield, I am enabled to not only clear off rain or similar deposits but also remove condensation which occurs upon the inner surface of the windshield. By having the windshield wiper provided with four cleaning elements or arms, the friction generated incident to the operation of the wiper will tend to heat the glass and soften the snow or ice and thus facilitate the removal thereof. While the device will generally be driven by power from the engine of the automobile, it may be operated by hand at times without affecting the operativeness of the power-driven mechanism in the slightest degree.

Having thus described the invention, I claim:

1. A windshield wiper comprising a bearing sleeve, a rock shaft journaled in and extending through said sleeve, said sleeve having a circumferential slot near its rear end and said shaft having an extended head at the front of the bearing sleeve, a wiper arm secured to the front end of the shaft, a collar loosely mounted upon the rear portion of the bearing sleeve, a wiper arm carried by the collar, and a fastening device connecting the collar to the shaft and extending through the slot in the bearing sleeve.

2. In a windshield wiper, the combination of a casing, wiper arms at the outer ends of the casing, means housed within the casing for oscillating the wiper arms, said means including a driving shaft mounted at the center of the casing, means for operatively connecting the shaft with the power plant of the automobile, a head on said shaft, and an eccentric mounted in the rear wall of the casing and bearing upon said head whereby to disconnect the shaft from the source of power.

In testimony whereof I affix my signature.

CARROLL H. BERILL.